(12) United States Patent
Kang

(10) Patent No.: US 10,711,772 B2
(45) Date of Patent: Jul. 14, 2020

(54) AIR COMPRESSOR

(71) Applicant: Yoosung Enterprise Co., Ltd., Asan-si, Chungcheongnam-do (KR)

(72) Inventor: Dae Shig Kang, Incheon (KR)

(73) Assignee: YOOSUNG ENTERPRISE CO., LTD., Asan-si, Chungcheongnam-do (KR)

( * ) Notice: Subject to any disclaimer, the term of this patent is extended or adjusted under 35 U.S.C. 154(b) by 231 days.

(21) Appl. No.: 15/455,486

(22) Filed: Mar. 10, 2017

(65) Prior Publication Data
US 2018/0058434 A1 Mar. 1, 2018

(30) Foreign Application Priority Data

Aug. 24, 2016 (KR) .................. 10-2016-0107540

(51) Int. Cl.
| | | |
|---|---|---|
| F04B 35/00 | (2006.01) | |
| F16D 43/28 | (2006.01) | |
| F16D 48/02 | (2006.01) | |
| F16D 25/0638 | (2006.01) | |
| F04B 41/02 | (2006.01) | |
| F04B 49/02 | (2006.01) | |
| F04B 53/14 | (2006.01) | |
| F16D 13/52 | (2006.01) | |
| F16D 13/64 | (2006.01) | |

(52) U.S. Cl.
CPC .......... *F04B 35/002* (2013.01); *F04B 41/02* (2013.01); *F04B 49/022* (2013.01); *F04B 53/14* (2013.01); *F16D 13/52* (2013.01); *F16D 13/648* (2013.01); *F16D 25/0638* (2013.01); *F16D 25/14* (2013.01); *F16D 43/28* (2013.01)

(58) Field of Classification Search
CPC ...... F04B 35/002; F04B 53/14; F04B 49/022; F04B 41/02; F04B 9/02; F16D 25/14; F16D 25/0638; F16D 43/28; F16D 13/52; F16D 13/648; F16D 25/06; F16D 25/062–064; F16D 25/082–087
USPC .................................................. 417/223, 319
See application file for complete search history.

(56) References Cited

U.S. PATENT DOCUMENTS

2017/0144540 A1* 5/2017 Kincaid ............... B60K 17/348

FOREIGN PATENT DOCUMENTS

| KR | 10-2007-0113013 A | 11/2007 | |
|---|---|---|---|
| WO | WO 2007/136168 | 11/2007 | |
| WO | WO-2007136168 A2 * | 11/2007 | .............. B60T 17/02 |

* cited by examiner

*Primary Examiner* — Alexander B Comley
(74) *Attorney, Agent, or Firm* — Rabin & Berdo, P.C.

(57) ABSTRACT

Disclosed is an air compressor in which a driving shaft and a crankshaft tube that surrounds the driving shaft are axially coupled, a clutch is installed between the driving shaft and a rear end of the crankshaft tube, and an air cylinder including a steam cylinder, a piston spaced apart at a certain distance from the steam cylinder, and an interval former installed between the steam cylinder and the piston is installed in a crankcase that forms a pump chamber, to prevent frictional ring plates that rub steel ring plates of the clutch together from being worn by a determined thickness or more by the interval former and simultaneously to cut off supplying of compressed air to the inlet of the air cylinder by the interval former in such a way that a connection state between the driving shaft and the crankshaft tube is continuously maintained.

1 Claim, 6 Drawing Sheets

AIR COMPRESSOR

CROSS-REFERENCE TO RELATED APPLICATION

This application claims priority to and the benefit of Korean Patent Application No. 10-2016-0107540, filed on Aug. 24, 2016, the disclosure of which is incorporated herein by reference in its entirety.

BACKGROUND

1. Field of the Invention

The present invention relates to an air compressor, and more particularly, to an air compressor in which an interval former is installed between a steam cylinder of an air cylinder and a piston and an operation of the air cylinder is blocked by the interval former when the piston approaches the steam cylinder at a determined distance or more to maintain driving forces of a driving shaft and a crankshaft tube.

2. Discussion of Related Art

Generally, a pneumatic device such as an air brake that brakes using a pressure of compressed air and an air switch that automatically opens and closes a door is mounted in a large vehicle such as a bus, truck, and a trailer. Compressed air is supplied to and stored in an air tank and provided to such a pneumatic device by an air compressor operated by power of an engine. For this, it is necessary to constantly maintain an adequate pressure of the compressed air stored in the air tank.

Patent document 1 is published as Korean Patent Publication No. 10-2006-0046686 and filed as WO 2007/136168. Herein, when a pressure in an air tank becomes higher than a set pressure and a signal pressure thereof is transferred to an unloader, a part of the pressure is injected as the signal pressure through an inlet. Here, when an air cylinder operates to push and move a clutch housing backward, a fixed clutch plate compresses a ring plate spring and moves the clutch housing backward to also move a movable clutch ring plate.

Then, since an interval is increased between the fixed clutch plate and the movable clutch ring plate, a close contact state between frictional ring plates and steel ring plates is released. Accordingly, even though the frictional ring plate rotates with a clutch wheel together, a rotating force thereof is not transferred to the steel ring plate and slips to allow the frictional ring plate to idle. Accordingly, since a driving force of a driving shaft is not transferred to a crankshaft tube and an operation of a pump piston stops, supplying of the compressed air to the air tank is stopped.

Afterward, since air pressure supplied from the unloader is removed when the pressure is reduced by using the compressed air stored in the air tank, the clutch housing is pushed and moved forward by repulsive forces of ring plate springs. Accordingly, since the piston is also moved forward at the same time and additionally the movable clutch ring plate pressurizes the frictional ring plate and the steel ring plate that are isolated from each other forward to allow them to come into close contact with each other, the driving force of the driving shaft is transferred to the crankshaft tube by a clutch to drive the pump piston, thereby supplying the compressed air again.

However, in the patent document 1 described above, since connection and release between the clutch housing and the clutch are repeated regardless of a wear state of the frictional ring plate that rubs against the steel ring plate and the repulsive forces of the ring plate springs do not act when the frictional ring plate is worn by a determined thickness or more due to the repeated operation, the frictional ring plate does not come into contact with the steel ring plate again and friction between the frictional ring plate and the steel ring plate is not performed. Accordingly, the clutch housing and the clutch remain in a released state and an operation of a crankshaft is stopped due to a connection state failure. Accordingly, since the pump piston does not operate, supplying air to the air tank is cut off and simultaneously it is impossible to drive the vehicle.

PRIOR ART DOCUMENT

Patent Document (Patent Document 1) KR10-0783778 B1

SUMMARY OF THE INVENTION

It is an aspect of the present invention to provide an air compressor in which a driving shaft and a crankshaft tube that surrounds an outer circumferential surface of the driving shaft are axially coupled, a clutch is installed between the driving shaft and a rear end of the crankshaft tube, and an air cylinder including a steam cylinder that forms an inlet in direct front of the clutch, a piston spaced apart at a certain distance from the steam cylinder, and an interval former installed between the steam cylinder and the piston is installed in a crankcase that forms a pump chamber, to prevent frictional ring plates that rub steel ring plates of the clutch together from being worn by a determined thickness or more by the interval former and simultaneously to cut off supplying of compressed air to the inlet of the air cylinder by the interval former in such a way that a connection state between the driving shaft and the crankshaft tube is continuously maintained.

One aspect of the present invention provides an air compressor including a crankcase attached to and installed at an engine and including a cover formed at a rear end thereof and a crank chamber formed therein, a pump chamber extending in a direction perpendicular to the crankcase and including an outlet that discharges compressed air, a driving shaft mounted in the crank chamber and including a driving gear receiving power of the engine and axially coupled with a fore-end exposed forward from the crankcase, a crankshaft tube axially coupled with the crank chamber of the driving shaft and including an eccentric part axially coupled with a shifting b of a connecting rod a of a pump piston mounted in the pump chamber and formed on an outer circumferential surface thereof, a clutch installed between the driving shaft and a rear end of the crankshaft tube to disconnect when a pressure of compressed air received from the pump chamber and stored in an air tank T becomes a setting value or more so that a driving force of the driving shaft is not transferred to the crankshaft tube and to connect when the pressure becomes less than the setting value so that the driving force is transferred to the crankshaft tube, and an air cylinder provided in the crank chamber, positioned in direct front of the clutch, and operating to stop an operation of connecting the driving force of the clutch when the pressure of the compressed air stored in the air tank becomes the setting value or more and a part of the pressure flows thereinto. Here, the air cylinder includes a steam cylinder including an inlet receiving a part of compressed air discharged from the air tank and installed at a position in direct front of the clutch in the crank chamber to be exposed outward between the pump chamber and the cover and axially coupled with and installed at a rear side of the crankshaft tube, a piston mounted in the steam cylinder and axially coupled with and installed at the crankshaft tube to move forward and backward, and an interval former installed between the steam cylinder and the piston to provide a certain interval or more between the steam cylinder and the piston.

The inlet of the steam cylinder may include a large diameter part that receives compressed air and a small diameter part that extends from the large diameter part and is bent in a direction to face the piston to guide the compressed air supplied to the large diameter part to a space between the steam cylinder and the piston.

The interval former installed between the steam cylinder and the piston may include a cutoff valve fixed to and installed on an inner wall of the piston, positioned in the same horizontal plane as the small diameter part, and horizontally moved by the piston to cut off the small diameter part of the steam cylinder.

The interval former may include a proximity sensor fixed to and installed on any one of an inner wall of the steam cylinder and an inner wall of the piston that face each other to sense whether the piston approaches the steam cylinder and a control valve that is fixed to and installed at the inlet and receives a signal of the proximity sensor to cut off compressed air that flows into the inlet.

The clutch may include a clutch wheel coupled with a spline part formed on an outer circumferential surface of a rear end of the driving shaft and including an inner spline engaged with the spline part and formed on an inner circumferential surface and an outer spline formed on an outer circumferential surface, a fixed clutch plate including an inside spline formed on an inner circumferential surface of a shaft tube and installed to be axially coupled and engaged with a rear side of an outside spline part formed on an outer circumferential surface of the rear end of the crankshaft tube and a fixed piece that extends at a rear end of an outer circumferential surface to perpendicularly surround, a cylindrical clutch housing including an inner spline formed on an inner circumferential surface of an arbor hole of a fore-end and axially coupled and engaged with an anterolateral part of the outside spline of the crankshaft tube, in which a diameter of a rear posterolateral part is greater than an external diameter of the fixed piece, and an inner circumferential spline formed on an inside thereof, a plurality of ring plate springs mounted to be interposed in a space between the fixed piece of the fixed clutch plate and a rear surface of the clutch housing in proportion to a length of the shaft tube, a movable clutch ring plate mounted and installed on the inside of a rear end of the clutch housing and having an internal diameter greater than a diameter of the clutch wheel and an external diameter identical to an internal diameter of the clutch housing, a plurality of frictional ring plates mounted to be alternately interposed in spaces formed between the fixed and movable clutch ring plates and, the clutch wheel, and the clutch housing, having a diameter having a size to isolate an outer circumferential surface thereof from the inner circumferential spline of the clutch housing and including a linked spline a engaged with the outer spline of the clutch wheel and formed at an inner circumferential surface of each of the arbor holes, and a plurality of steel ring plates each with an internal diameter having a size to be isolated from the outer spline of the clutch wheel and including an electrically-driven spline a engaged with the inner circumferential spline of the clutch housing on each of outer circumferential surfaces thereof.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the attached drawings.

Figure 1:
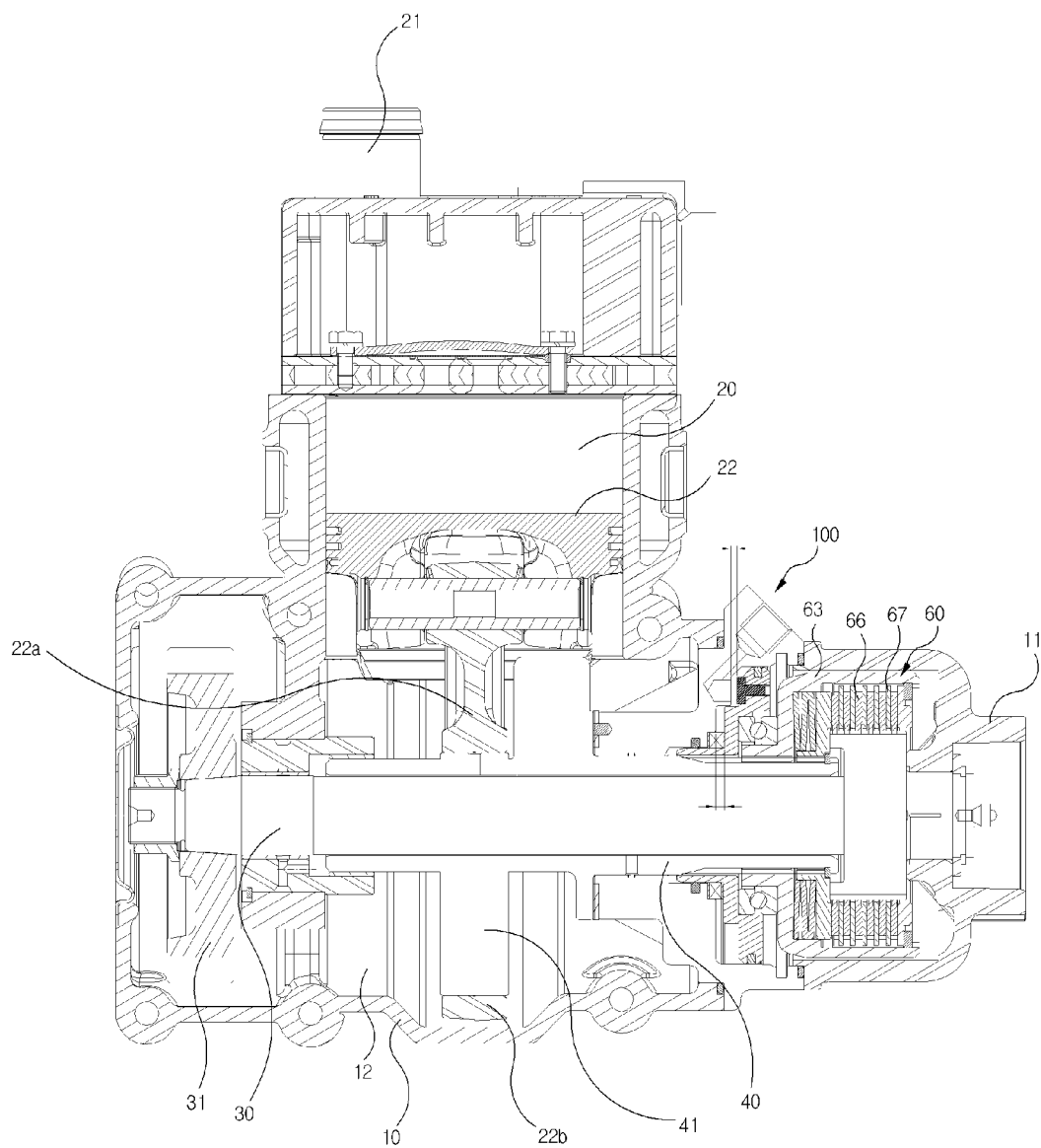
FIG. 1 is a side cross-sectional view of an air compressor according to a first embodiment of the present invention.
Figure 2:
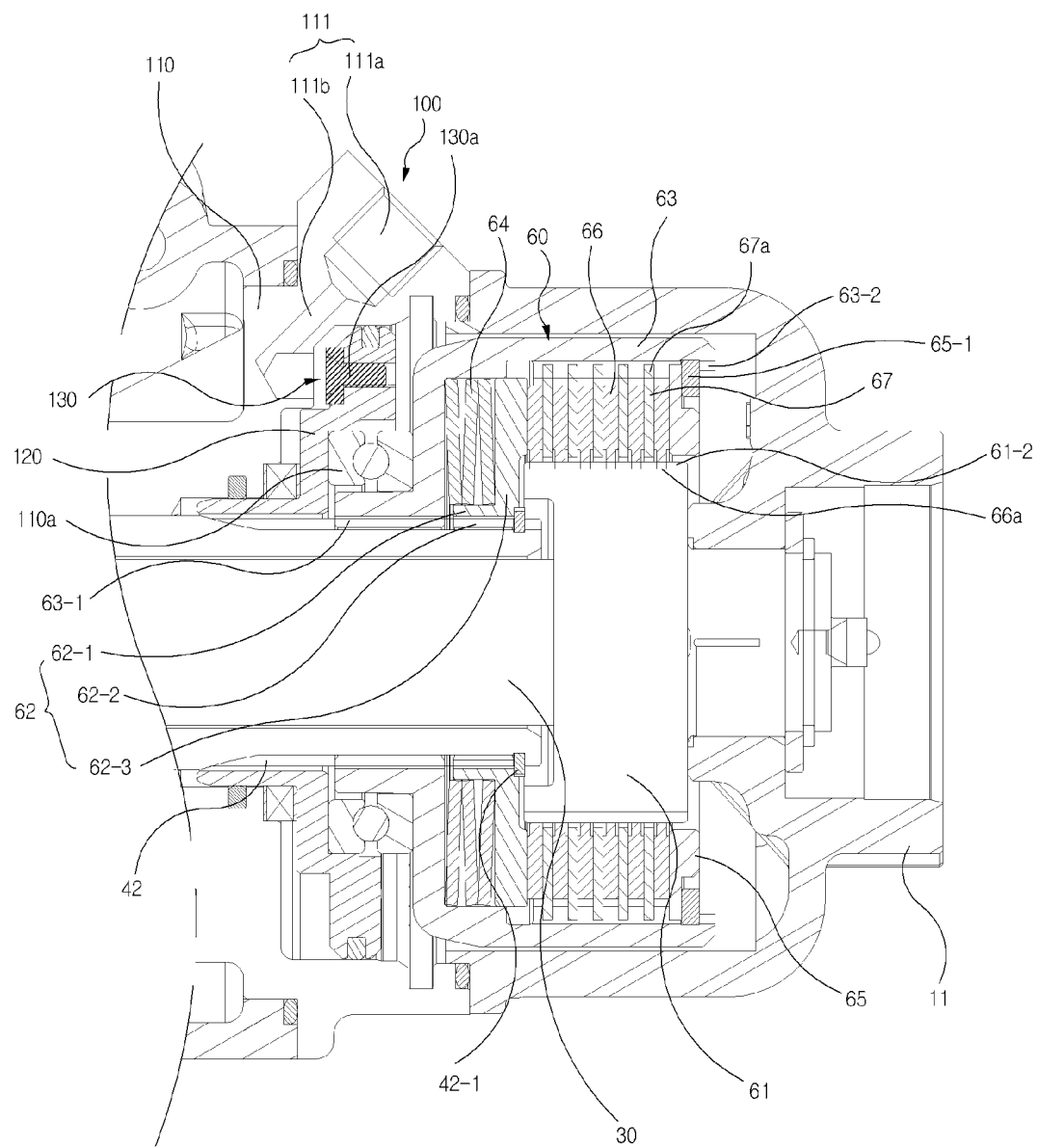
FIG. 2 is an enlarged view illustrating a main part of the air compressor according to the first embodiment.
Figure 3:
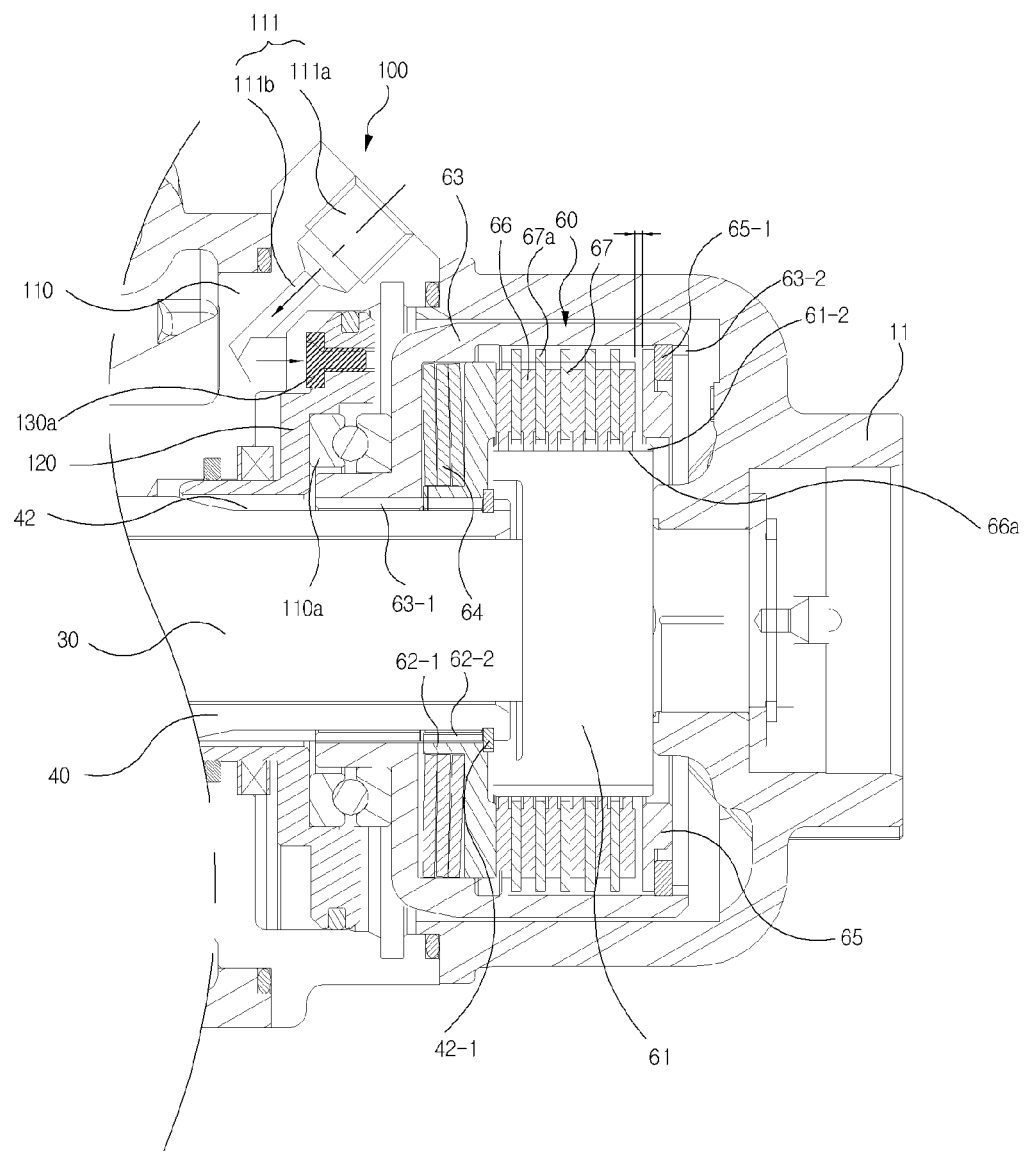
FIG. 3 is a view illustrating a state in which compressed air is injected into an inlet of the air compressor according to the first embodiment.
Figure 4:
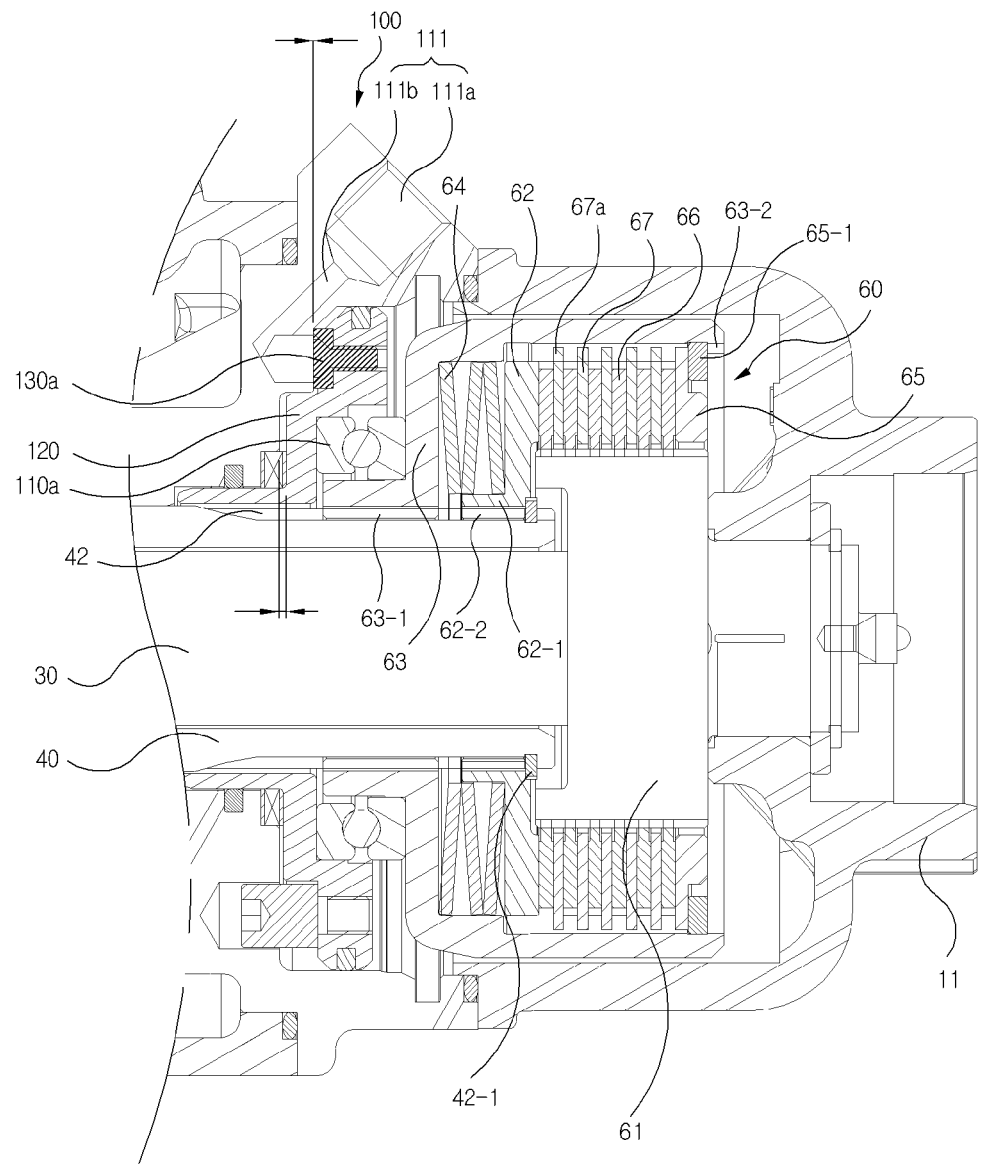
FIG. 4 is a view illustrating a state in which a frictional ring plate of the air compressor according to the first embodiment is worn and an interval former blocks the inlet.
Figure 5:
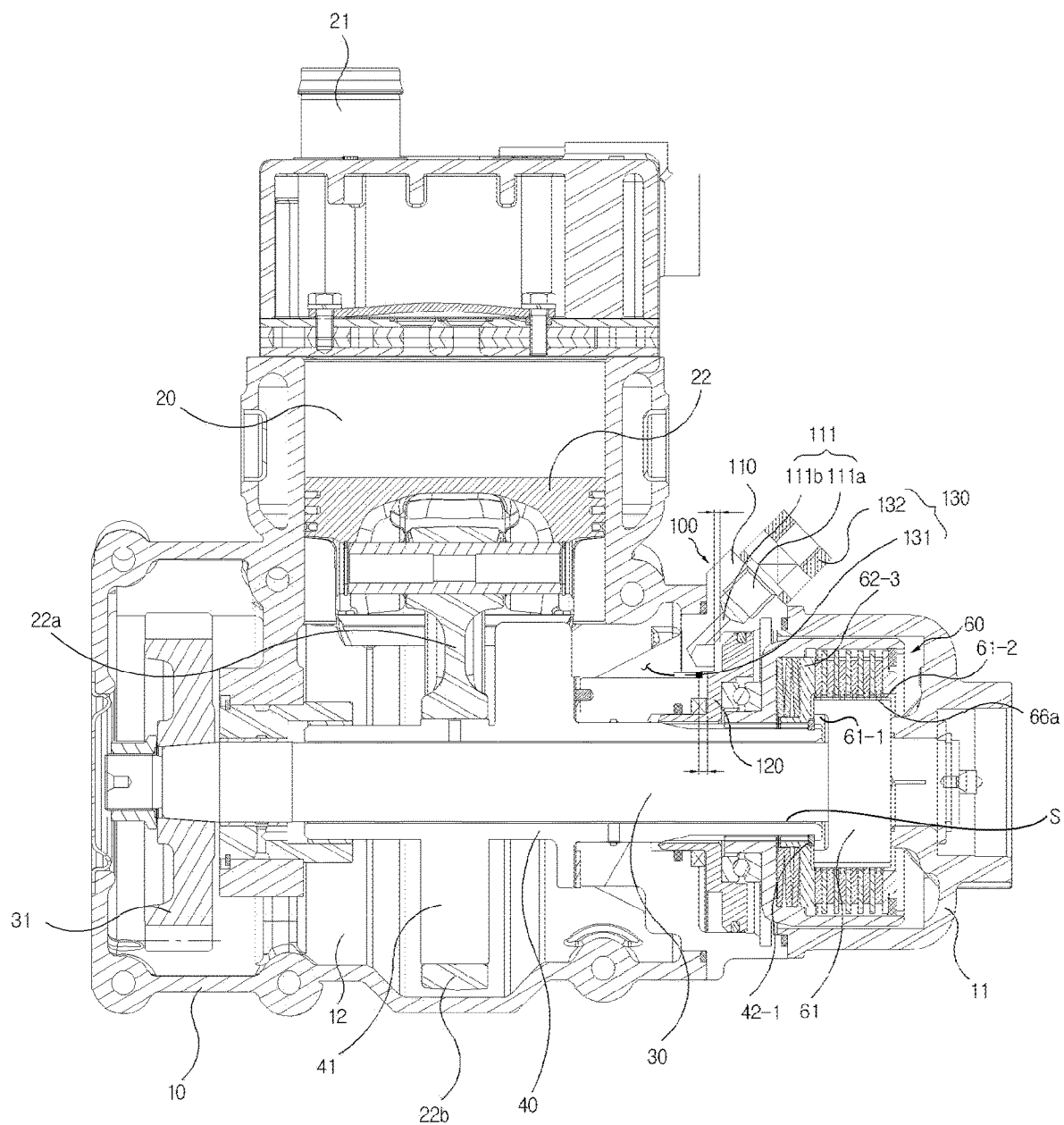
FIG. 5 is a side cross-sectional view of an air compressor according to a second embodiment of the present invention.
Figure 6:
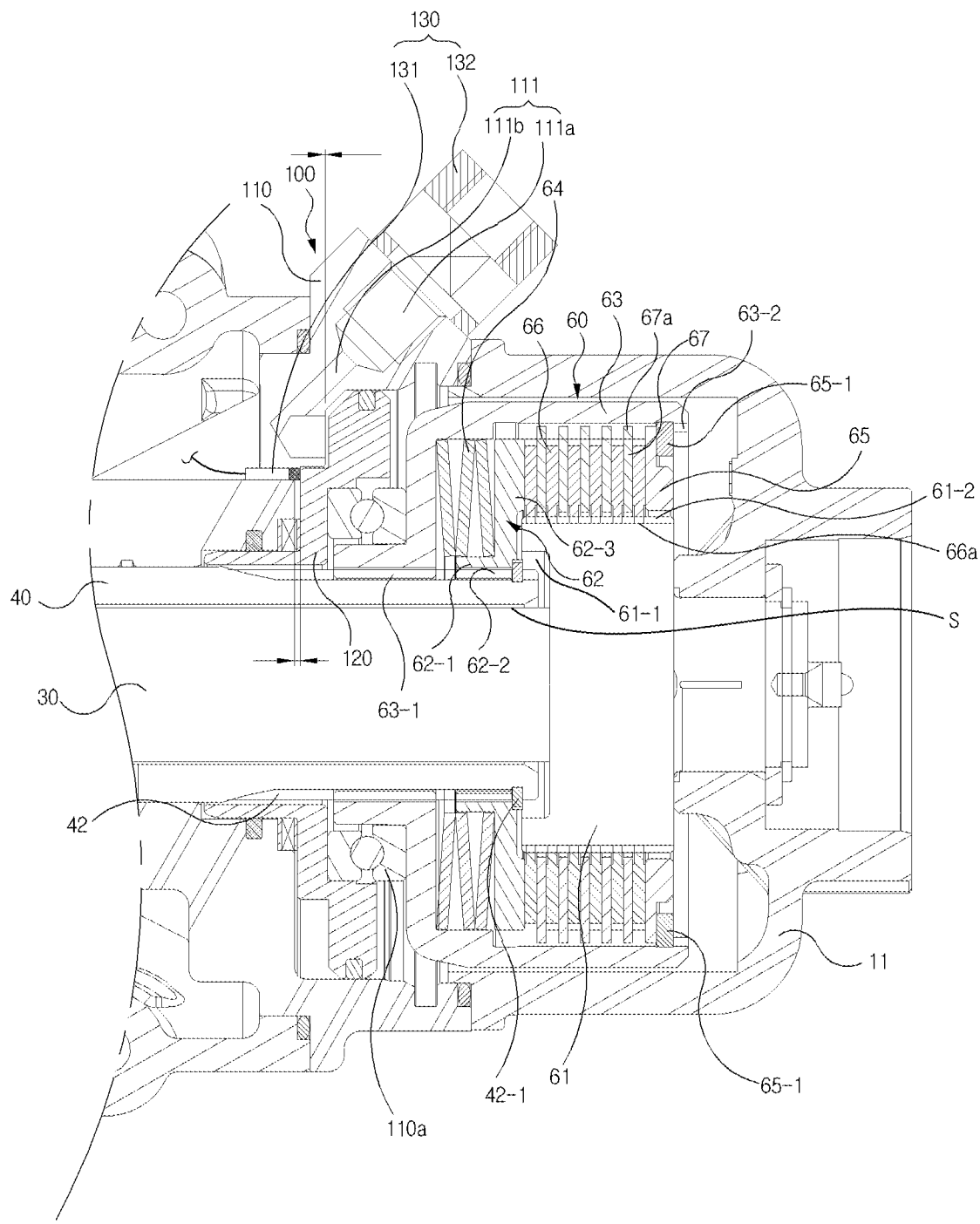
FIG. 6 is an enlarged view illustrating a main part of the air compressor according to the second embodiment.

Referring to FIGS. 1 to 6, an air compressor according to an embodiment of the present invention includes a crankcase 10 installed by attaching a front surface thereof to a corresponding position of an engine (not shown) and including a crank chamber 12, a pump chamber 20 installed at a certain part of the crankcase 10 to be perpendicular to the crank chamber 12, a driving shaft 30 in which a driving gear 31 engaged with a timing gear (not shown) of the engine to be rotated is mounted and installed at a fore-end exposed forward by passing through an arbor hole formed in front of the crankcase 10, a cover 10a mounted and installed to cover an open rear end of the crankcase 10, a crankshaft tube 40 axially coupled to pass through parts except a spline part formed on an outer circumferential surface of a rear end among parts of the driving shaft 30 accommodated in the crank chamber 12 and with an outer circumferential surface corresponding to the pump chamber 20 at which an eccentric part 41 axially coupled with a connecting rod 22a of a pump piston 22 is formed, a clutch 60 installed between the rear end of the driving shaft 30 and a rear end of the crankshaft tube 40 to transfer or cut off a driving force of the driving shaft 30 to the crankshaft tube 40, and an air cylinder 100 that is installed in the rear of the crank chamber 12 to be positioned in direct front of the clutch 60 and stops or starts an operation of the clutch 60 when a signal pressure is put into an inlet 111 or not.

The driving shaft 30 and the crankshaft tube 40 are allowed to be smoothly rotated by interposing bushes between an inner circumferential surface of the arbor hole formed in front of the crankcase 10 and an outer circumferential surface of the fore-end of the driving shaft 30 that passes through the arbor hole and between inner surfaces of fore and rear ends of the crankshaft tube 40 with which the driving shaft 30 is coupled.

Also, a diameter of a part of the driving shaft 30 accommodated in the crank chamber 12 is formed to be relatively smaller than the fore-end thereof that passes through a through hole not to allow the crankshaft tube 40 to slip forward. An external diameter of an outer circumferential surface of a part at the rear end of the crankshaft tube 40 that is coupled with a steam cylinder 110 of the air cylinder 100 is formed to be smaller than that of the fore-end not to slip backward.

Accordingly, the crankshaft tube 40 does not slip forward and backward and rotates in place at all the time during rotation, and accordingly, a shafting 22b of the connecting rod 22a axially coupled with the eccentric part 41 does not deviate from the eccentric part 41 and a reciprocating operation of the pump piston 22 is normally performed.

The clutch 60 includes a clutch wheel 61 coupled with a spline part S formed on the outer circumferential surface of the rear end of the driving shaft 30 and mounted and installed using a snap ring 65-1 not to slip forward and backward and including an inner spline 61-1 engaged with the spline part S and formed on an inner circumferential surface and an outer spline 61-2 formed on an outer circumferential surface, a fixed clutch plate 62 including an inside spline 62-2 formed on an inner circumferential surface of a shaft tube 62-1 and installed to be axially coupled and engaged with a rear side of an outside spline part 42 formed on the outer circumferential surface of the rear end of the crankshaft tube 40 in such a way that the rear end is held by a snap ring 42-1 mounted and installed in a rear end of the outside spline part 42 to be installed not to move backward, and a fixed piece 62-3 that extends at a rear end of the outer circumferential surface to perpendicularly surround, a cylindrical clutch housing 63 including an inner spline 63-1 formed on an inner circumferential surface of an arbor hole of a fore-end and installed to be axially coupled and engaged with an anterolateral part of the outside spline part 42 of the crankshaft tube 40, in which a diameter of a rear posterolateral part is greater than an external diameter of the fixed piece 62-3, and an inner circumferential spline 63-2 formed on an inside thereof, a plurality of ring plate springs 64 mounted in spaces between the rear side of the fixed piece 62-3 of the clutch plate 62 and front sides of the clutch housing 63 by the shaft tube 62-1, a movable clutch ring plate 65 in which an internal diameter is greater than a diameter of the clutch wheel 61, an external diameter is identical to an internal diameter of a rear end of the clutch housing 63, and a rear end of an outer circumferential surface is held by the snap ring 65-1 mounted and installed on the inside of the rear end of the clutch housing 63 not to be separated backward and to be internally mounted on the rear end, a plurality of frictional ring plates 66 mounted to be alternately interposed in spaces formed between the fixed clutch plate 62 and movable clutch ring plate 65, the clutch wheel 61, and the clutch housing 63, having a diameter having a size to be isolated from the inner circumferential spline 63-2 of the clutch housing 63, and including a linked spline 66a engaged with the outer spline 61-2 of the clutch wheel 61 and formed at an inner circumferential surface of each of the arbor holes, and a plurality of steel ring plates 67 each with an internal diameter having a size to be isolated from the outer spline 61-2 of the clutch wheel 61 and including an electrically-driven spline 67a engaged with the inner circumferential spline 63-2 of the clutch housing 63 on each of outer circumferential surfaces thereof.

Accordingly, in the clutch 60, since the movable clutch ring plate 65 mounted in the rear end thereof is also moved forward when the clutch housing 63 is pushed and moved forward by acting of repulsive forces of the plurality of ring plate springs 64, the frictional ring plates 66 and the steel ring plates 67 alternately fixed are moved forward by a distance of the movement of the movable clutch ring plate 65. Here, since the repulsive force of the ring plate spring 64 acts as a force to push the fixed clutch plate 62 backward, the fixed clutch plate 62 remains in a stationary state and accordingly the frictional ring plates 66 and the steel ring plates 67 come into contact with one another without a gap as a single body.

In this state, when the driving shaft 30 is driven, a driving force thereof is transferred to each of the frictional ring plates 66 by the linked spline 66a engaged with the outer spline 61-2 of the clutch wheel 61. Then, since each of the frictional ring plates 66 is in close contact with each of the steel ring plate 67 as a single body, the driving force is transferred to the clutch housing 63 by the inner circumferential spline 63-2 engaged with the electrically-driven spline 67a and accordingly the clutch housing 63 is driven. Accordingly, the driving force is transferred to the outside spline part 42 engaged with the inner spline 63-1 to drive the crankshaft tube 40.

Like this, when the crankshaft tube 40 is driven, the pump piston 22 linearly reciprocates inside the pump chamber 20 by the connecting rod 22a with the shafting 22b axially-coupled with the eccentric part 41 and compressed air generated according thereto is discharged through an outlet 21 and supplied to and stored in an air tank (not shown).

Particularly, the clutch wheel 61 and the driving shaft 30 are formed as a single body and integrally rotated.

When a pressure of the compressed air supplied to the air tank becomes higher than a set pressure due to the operation, a part of the pressure is injected as a signal pressure into the inlet 111. Then, a piston 120 operates to push and move the clutch housing 63 backward. Here, since the fixed clutch plate 62 is supported not to slip backward by the snap ring 65-1 at a rear end thereof, the clutch housing 63 moves backward while compressing the ring plate springs 64 in such a way that the movable clutch ring plate 65 also moves.

Then, since a gap between the fixed clutch plate 62 and the movable clutch ring plate 65 becomes increased, a close contact between the frictional ring plate 66 and the steel ring plate 67 is released. Accordingly, even though the frictional ring plate 66 rotates with the clutch wheel 61, since a rotating force is not transferred to the steel ring plate 67 and slips, the frictional ring plate 66 idles. The driving force of the driving shaft 30 is not transferred to the crankshaft tube 40 and the operation of the pump piston 22 stops in such a way that the supplying of the compressed air to the air tank is stopped.

The air cylinder 100 is installed at a position in direct front of the clutch 60 in the crank chamber 12 to allow only a part at which the inlet 111 into which the signal pressure that is compressed air is injected to be exposed between the pump chamber 20 and the cover 11 and includes the steam cylinder 110 that includes the inlet 111 and is axially-coupled with a rear of the crankshaft tube 40 to be fixed and installed thereto, the piston 120 mounted in the steam cylinder 110 through an open rear thereof and axially-coupled with the crankshaft tube 40 to move forward and backward in a certain range, and an interval former 130 installed between the steam cylinder 110 and the piston 120 to provide a certain interval or more between the steam cylinder 110 and the piston 120.

Also, a bearing 110a is interposed between a rear side of the piston 120 and a front side of the clutch housing 63 to maintain the interval therebetween and simultaneously to support the clutch housing 63 to smoothly rotate.

In the air cylinder 100 configured as described above, when a pressure of compressed air stored in the air tank further increases than a set pressure and the increased pressure is injected into the steam cylinder 110 through the inlet as a signal pressure, the piston 120 is moved backward and the clutch housing 63 is pushed and moved backward. Accordingly, since the ring plate spring 64 is compressed and the frictional ring plates 66 and the steel ring plates 67 are isolated from each other, transfer of the driving force of the driving shaft 30 by the clutch 60 is disconnected and the driving of the crankshaft tube 40 is stopped.

After that, since a signal air pressure supplied from a governor (not shown) disappears when the compressed air stored in the air tank is used and the pressure thereof is decreased due thereto, the clutch housing 63 is pushed and moved forward by repulsive forces of the ring plate springs 64. Accordingly, the piston 120 is also moved forward at the same time. In addition, since the movable clutch ring plate 65 forwardly pushes and pressurizes the frictional ring plates 66 and the steel ring plates 67 isolated from each other to allow them to come into close contact with each other. Accordingly, the driving force of the driving shaft 30 is transferred to the crankshaft tube 40 by the clutch 60 and drives the pump piston 22 in such a way that an operation of supplying compressed air is performed again.

Particularly, as soon as the signal air pressure is cut off by the governor, the driving shaft 30 and the crankshaft tube 40 are connected by instantaneously restricting the frictional ring plates 66 and the steel ring plates 67 of the clutch 60 by elastic forces of the ring plate springs 64.

During the operation process described above, a distance between forward and backward movements of the piston 120 of the air cylinder 100 is a degree at which the clutch housing 63 is moved forward by repulsive forces of the ring plate springs 64 and the frictional ring plates 66 and the steel ring plates 67 come into close contact with each other as a single body and rotate together.

Also, the interval former 130 cuts off supplying of compressed air that is injected through the inlet 111 to prevent the frictional ring plates 66 from being worn by a determined thickness or more.

Also, the inlet 111 of the steam cylinder 110 includes a large diameter part 111a that receives compressed air and a small diameter part 111b that extends from the large diameter part 111a and is bent in a direction to face the piston 120 to guide the compressed air supplied to the large diameter part 111a to a space between the steam cylinder 110 and the piston 120.

Here, the large diameter part 111a receives and guides the compressed air supplied from the air tank to the small diameter part 111b and accordingly the small diameter part 111b guides the compressed air to the space between the piston 120 and the steam cylinder 110.

As a first embodiment, the interval former 130 installed between the steam cylinder 110 and the piston 120 includes a cutoff valve 130a fixed to and installed on an inner wall of the piston 120, positioned in the same horizontal plane as the small diameter part 11b, and horizontally moved by the piston 120 to cut off the small diameter part 111b of the steam cylinder 110.

Also, the cutoff valve 130a may be used as a check valve. When used as a check valve (not shown), the cutoff valve 130a is pressurized by air supplied through the air cylinder 100 and pushes the piston 120 toward the clutch 60. However, when air supplied to the air cylinder 100 is cut off, air between the air cylinder 100 and the piston 120 is discharged toward the air cylinder 100 through the check value at a pair of through holes (not shown) formed in an outer surface to be communicated. Accordingly, movements of the piston 120 and the clutch housing 63 are rapidly performed and a close contact between the driving shaft 30 and the crankshaft tube 40 is rapidly performed.

That is, when the frictional ring plates 66 are worn corresponding to the determined thickness, the clutch housing 63 pushed by the ring plate springs 64 pushes the piston 120 and here the cutoff valve 130a fixed to and installed on the inner wall of the piston 120 is horizontally moved and comes into close contact with the small diameter part 111b.

Here, a diameter of the cutoff valve 130a is formed to be relatively larger than a diameter of the small diameter part 111b.

Then, as compressed air passes through the small diameter part 111b formed to be relatively smaller than the large diameter part 111a, an injection force thereof is decreased. Here, since the injection force is relatively weaker than elastic forces of the ring plate springs 64, the piston 120 is not pushed toward the clutch 60 and intactly the small diameter part 111b is cut off.

Here, the clutch 60 remains in a contact state with the driving shaft 30 and accordingly the crankshaft tube 40 is continuously operated by the driving force of the driving shaft 30 and continuously supplies compressed air to the air tank.

Also, according to a second embodiment, the interval former 130 includes a proximity sensor 131 or a switch (not shown) fixed to and installed on any one of an inner wall of the steam cylinder 110 and the inner wall of the piston 120 that face each other to sense whether the piston 120 approaches the steam cylinder 110 and a control valve 132 that is fixed to and installed at the inlet 111 and receives a signal of the proximity sensor 131 to cut off compressed air that flows into the inlet 111.

Here, when the frictional ring plates 66 are worn corresponding to a determined thickness, the clutch housing 63 pushed by the ring plate springs 64 pushes the piston 120 and here the proximity sensor 131 or the switch fixed to and installed on any one of the inner walls of the piston 120 and the steam cylinder 110 senses whether the piston 120 approaches the steam cylinder 110.

That is, when the proximity sensor 131 or the switch senses whether the piston 120 is moved by a determined distance or more toward the steam cylinder 110, the proximity sensor 131 or the switch transfers a signal to the control valve 132 and the control valve 132 that receives the signal cuts off a flow of the compressed air supplied to the inlet 111.

Then, the compressed air is not supplied to a space between the steam cylinder 110 and the piston 120 of the air cylinder 100 and the operation of the air cylinder 100 is stopped. At the same time, the clutch housing 63 is pushed toward the steam cylinder 110 by elastic forces of the ring plate springs 64.

Here, the clutch 60 remains in a contact state with the driving shaft 30 and accordingly the crankshaft tube 40 is continuously operated by the driving force of the driving shaft 30 and continuously supplies compressed air to the air tank.

Also, although it is described that the pump chamber 20 is unitarily installed in the embodiment of the present invention, a plurality of pump chambers may be included in a vehicle that has a large consumption amount of compressed air and needs rapid supplying of the compressed air and high capacity. In proportion thereto, pluralities of pump pistons 22, connecting rods 22a, eccentric parts 41 and the like may be installed.

Also, although a case of forming a single pump chamber 20 is not shown in the drawings with respect to the embodiment of the present invention, it has been omitted because of being more simply applicable than the plurality of pump chambers 20. In this case, it will not be departed from the scope of the present invention.

In a structure in which an interval former is installed between a steam cylinder and a piston of an air cylinder to prevent frictional ring plates from being worn by a determined thickness or more and simultaneously to cut off a flow of compressed air injected into an inlet of a signal air pressure as described above, frictional ring plates that rub steel ring plates together may be blocked and prevented by the interval former from being worn by the determined thickness or more, the flow of compressed air supplied through the inlet of the air cylinder may be automatically cut off by the interval former when the frictional ring plates are worn corresponding to the determined thickness, and a connection state between a driving shaft and a crankshaft tube may be continuously maintained by cutting off the flow of compressed air.

According to the embodiments of the present invention, frictional ring plates that rub steel ring plates together may be prevented from being worn by a determined thickness or more by shielding using an interval former, the interval former may automatically cut off a flow of compressed air supplied through an inlet of an air cylinder when the frictional ring plates are worn to correspond to the determined thickness, a connection state between the driving shaft and the crankshaft tube may be continuously maintained by cutting off the flow of the compressed air, and accordingly, the compressed air may be smoothly supplied to an air tank of a vehicle to enable the vehicle to be driven even though the frictional ring plates are worn.

The air compressor described above is not limited to the embodiments described above and may be variously modified by one of ordinary skill in the art without departing from the essentials of the present invention including the technical concept defined by the following claims and equivalents thereof.

What is claimed is:

1. An air compressor comprising:
   a crankcase (10) attached to and installed at an engine and comprising a cover (11) formed at a rear end thereof and a crank chamber (12) formed therein;
   a pump chamber (20) extending in a direction perpendicular to the crankcase (10) and comprising an outlet (21) that discharges compressed air;
   a driving shaft (30) mounted in the crank chamber (12) and comprising a driving gear (31) receiving power from the engine and axially coupled with a fore-end of the driving shaft that is exposed forward from the crankcase (10);
   a crankshaft tube (40) axially coupled with the driving shaft (30) and comprising an eccentric part (41) axially coupled with a shafting (22b) of a connecting rod (22a) of a pump piston (22) mounted in the pump chamber (20) and which is formed on an outer circumferential surface of the crankshaft tube;
   a clutch (60) installed between the driving shaft (30) and a rear end of the crankshaft tube (40) to disconnect when a pressure of compressed air received from the pump chamber (20) and stored in an air tank (T) becomes a setting value or more so that a driving force of the driving shaft (30) is not transferred to the crankshaft tube (40) and to connect when the pressure becomes less than the setting value so that the driving force is transferred to the crankshaft tube (40), wherein the clutch (60) comprises:
   a clutch wheel (61) coupled with a spline part (S) formed on an outer circumferential surface of a rear end of the driving shaft (30) and comprising an inner spline (61-1) engaged with the spline part (S) and formed on an inner circumferential surface and an outer spline (61-2) formed on an outer circumferential surface of the clutch wheel (61);
   a fixed clutch plate (62) comprising an inside spline (62-2) formed on an inner circumferential surface of a shaft tube (62-1) and installed to be axially coupled and engaged with a rear side of an outside spline part (42) formed on an outer circumferential surface of the rear end of the crankshaft tube (40) and a fixed piece (62-3) that extends from a rear end of the inside spline (62-2);
   a cylindrical clutch housing (63) comprising an inner spline (63-1) formed on an inner circumferential surface of an arbor hole of a fore-end of the cylinder clutch housing (63) and axially coupled and engaged with an anterolateral part of the outside spline part (42) of the crankshaft tube (40), and an inner circumferential spline (63-2) formed on an inside thereof;
   a plurality of ring plate springs (64) mounted to be interposed in a space between the fixed piece (62-3) of the fixed clutch plate (62) and a rear surface of the clutch housing (63) in proportion to a length of the shaft tube (62-1);
   a movable clutch ring plate (65) mounted and installed on the inside of a rear end of the clutch housing (63) and having an internal diameter greater than a diameter of the clutch wheel (61) and an external diameter identical to an internal diameter of the clutch housing (63);
   a plurality of frictional ring plates (66) mounted to be alternately interposed in spaces formed between the fixed clutch plate (62) and the movable clutch ring plate (65), the clutch wheel (61), and the clutch housing (63), and comprising a linked spline (66a) engaged with the outer spline (61-2) of the clutch wheel (61) and formed at an inner circumferential surface of the arbor hole; and
   a plurality of steel ring plates (67) each with an internal diameter comprising an electrically-driven spline (67a) engaged with the inner circumferential spline (63-2) of the clutch housing (63); and
   an air cylinder (100) provided in the crank chamber (12), positioned in front of the clutch (60), and operating to stop an operation of connecting the driving force of the clutch (60) when the pressure of the compressed air stored in the air tank (T) becomes the setting value or more and a part of the pressure flows thereinto,
   wherein the air cylinder (100) comprises:
   a hollow cylinder (110) comprising an inlet (111) receiving a part of compressed air discharged from the air tank (T) and installed at a position in front of the clutch (60) in the crank chamber (12) to be exposed outward between the pump chamber (20) and the cover (11) and axially coupled with and installed at a rear side of the crankshaft tube (40);
   a piston (120) mounted in the hollow cylinder (110) and axially coupled with and installed at the crankshaft tube (40) to move forward and backward; and
   an interval former (130), installed between the hollow cylinder (110) and the piston (120), configured to provide a distance between the hollow cylinder (110) and the piston (120), the interval former (130) including a proximity sensor (131) installed on either an inner wall of the hollow cylinder (110) or an inner wall of the piston (120) to detect a movement of the piston (120) and transfer a signal when the piston (120) reaches a predetermined distance from the hollow cylinder (110), and a control valve (132) installed at an entrance of the inlet (111) of the hollow cylinder (110) and configured to cut off the compressed air that flows into the inlet (111) in response to detection of the signal of the proximity sensor (131) with respect to the piston (120) reaching the predetermined distance, wherein the inlet (111) of the hollow cylinder (110) includes a large diameter part (111a) that receives compressed air; and a small diameter part (111b) that extends from the large diameter part (111a) and is bent in a direction to face the piston (120) to guide the compressed air supplied to the large diameter part (111a) to a space between the hollow cylinder (110) and the piston (120), and wherein the piston (120) of the air cylinder (100) and the operation of the air cylinder (100) is stopped and the clutch housing (63) is pushed toward the hollow cylinder (110) by the ring plate springs (64), wherein a connection state between the driving shaft (30) and the crankshaft tube (40) is continuously maintained by cutting off the flow of compressed air, and wherein the plurality of frictional ring plates (66) are prevented from being worn by a determined thickness by cutting off the compressed air that flows into the inlet (111).

\* \* \* \* \*